(12) United States Patent
Ooyabu

(10) Patent No.: US 7,233,234 B2
(45) Date of Patent: Jun. 19, 2007

(54) AIRBAG ELECTRICAL CONTROL UNIT

(75) Inventor: Shinji Ooyabu, Anjo (JP)

(73) Assignee: Denso Corporation, Kariya (JP)

( * ) Notice: Subject to any disclaimer, the term of this patent is extended or adjusted under 35 U.S.C. 154(b) by 498 days.

(21) Appl. No.: 10/916,554

(22) Filed: Aug. 12, 2004

(65) Prior Publication Data

US 2005/0073137 A1 Apr. 7, 2005

(30) Foreign Application Priority Data

Oct. 6, 2003 (JP) .............................. 2003-347369

(51) Int. Cl.
- B60Q 1/00 (2006.01)
- B60R 25/10 (2006.01)
- B60R 21/16 (2006.01)
- B60R 22/00 (2006.01)
- H04N 7/18 (2006.01)

(52) U.S. Cl. .............. 340/436; 340/425.5; 340/426.18; 340/426.21; 340/435; 340/436; 348/143; 348/148; 701/45; 701/46; 701/47; 280/734; 280/735

(58) Field of Classification Search ............. 340/425.5, 340/426.18, 426.21, 435–436; 348/143, 348/148; 280/734–735; 701/45–47
See application file for complete search history.

(56) References Cited

U.S. PATENT DOCUMENTS

| | | | |
|---|---|---|---|
| 5,555,286 A | 9/1996 | Tendler | |
| 6,223,847 B1 * | 5/2001 | Shimizu et al. | 180/204 |
| 6,606,027 B1 * | 8/2003 | Reeves et al. | 340/436 |
| 6,711,399 B1 * | 3/2004 | Granier | 455/404.1 |
| 6,856,874 B2 * | 2/2005 | Weilkes et al. | 701/45 |
| 6,922,137 B1 * | 7/2005 | Bycroft | 340/425.5 |
| 2002/0039951 A1 | 4/2002 | Hasegawa | |

FOREIGN PATENT DOCUMENTS

| | | |
|---|---|---|
| JP | A-5-139250 | 6/1993 |
| JP | A-10-81205 | 3/1998 |
| JP | A-2000-43764 | 2/2000 |
| JP | A-2001-71870 | 3/2001 |
| JP | A-2002-302016 | 10/2002 |

* cited by examiner

Primary Examiner—Daniel Wu
Assistant Examiner—Lam Pham
(74) Attorney, Agent, or Firm—Posz Law Group, PLC

(57) ABSTRACT

An airbag electrical control unit mounted in a vehicle includes a position detecting circuit that detects a current position of the vehicle; a computing circuit that computes impact that the vehicle undergoes using a signal from a sensor; and a notifying circuit that notifies a previously designated recipient of a notification data that includes the detected current information alone or both the detected current position and the computed impact. Here, a traveling mode that addresses a traveling-period trouble generated while the vehicle is traveling and a parking mode that addresses a parking-period trouble generated while the vehicle is being parked are switched into each other.

11 Claims, 6 Drawing Sheets

AIRBAG ELECTRICAL CONTROL UNIT

CROSS REFERENCE TO RELATED APPLICATIONS

This application is based on and incorporates herein by reference Japanese Patent Application No. 2003-347369 filed on Oct. 6, 2003.

FIELD OF THE INVENTION

The present invention relates to an airbag electrical control unit that controls an airbag system mounted on a vehicle.

BACKGROUND OF THE INVENTION

For instance, Patent document 1 describes an automatic notification system that uses a navigation system, a transmission module, and a cell phone in an integrated manner. The transmission module receives emergency signals such as an airbag expansion signal, an emergency button ON signal, etc, further receiving a vehicle's current position that is obtained from a GPS (Global Positioning System) of the navigation system. The transmission module generates sound notification data, from the emergency signals and the current position. The generated notification data is then sent to a previously designated notification recipient via the cell phone.

In the above automatic notification system, the cell phone and navigation system are indispensable. Therefore, an occupant who has no cell phone, or a vehicle that has no navigation system cannot use this automatic notification system, which indicates that this automatic notification system is not provided with practicability or expandability.

Further, the automatic notification system deals with only a traveling-period trouble that occurs while the vehicle is traveling. By contrast, Patent documents 2, 3, 4 describe alarming systems that deal with parking-period troubles such as stealing that occurs while vehicles are being parked; however, these alarming systems do not transmit notification data to notification recipients.

(Patent document 1: U.S. Pat. No. 5,555,286 A)
(Patent document 2: JP-H5-139250 A)
(Patent document 3: JP-2002-67882A (US 2002/0039951 A1))
(Patent document 4: JP-2001-71870 A)

SUMMARY OF THE INVENTION

An airbag electrical control unit is devised in consideration of the above problem. It is therefore an object of the present invention to provide an airbag electrical control unit that can deal with both a traveling-period trouble and a parking-period trouble, automatically notify a notification recipient of notification data, and provide practicability and expandability.

To achieve the above object, an airbag electrical control unit mounted in a vehicle is provided with the following. A position detecting circuit is included for detecting a current position of the vehicle. A computing circuit is included for computing impact that the vehicle undergoes, using a signal from a sensor. A notifying circuit is included for notifying a previously designated recipient of notification data that includes the detected current information alone or both the detected current position and the computed impact. Here, a traveling mode and a parking mode are switched therebetween. The traveling mode addresses a traveling-period trouble generated while the vehicle is traveling, while the parking mode addresses a parking-period trouble generated while the vehicle is being parked.

In recent years, an airbag system is widely adopted in a great deal of vehicles, further being supposed to be expanding to the future. The above-described structure of the present invention enables an airbag electrical control unit of the airbag system to be effectively utilized not only in a traveling period but also in a parking period by utilizing a reliable characteristic of the airbag electrical control unit.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
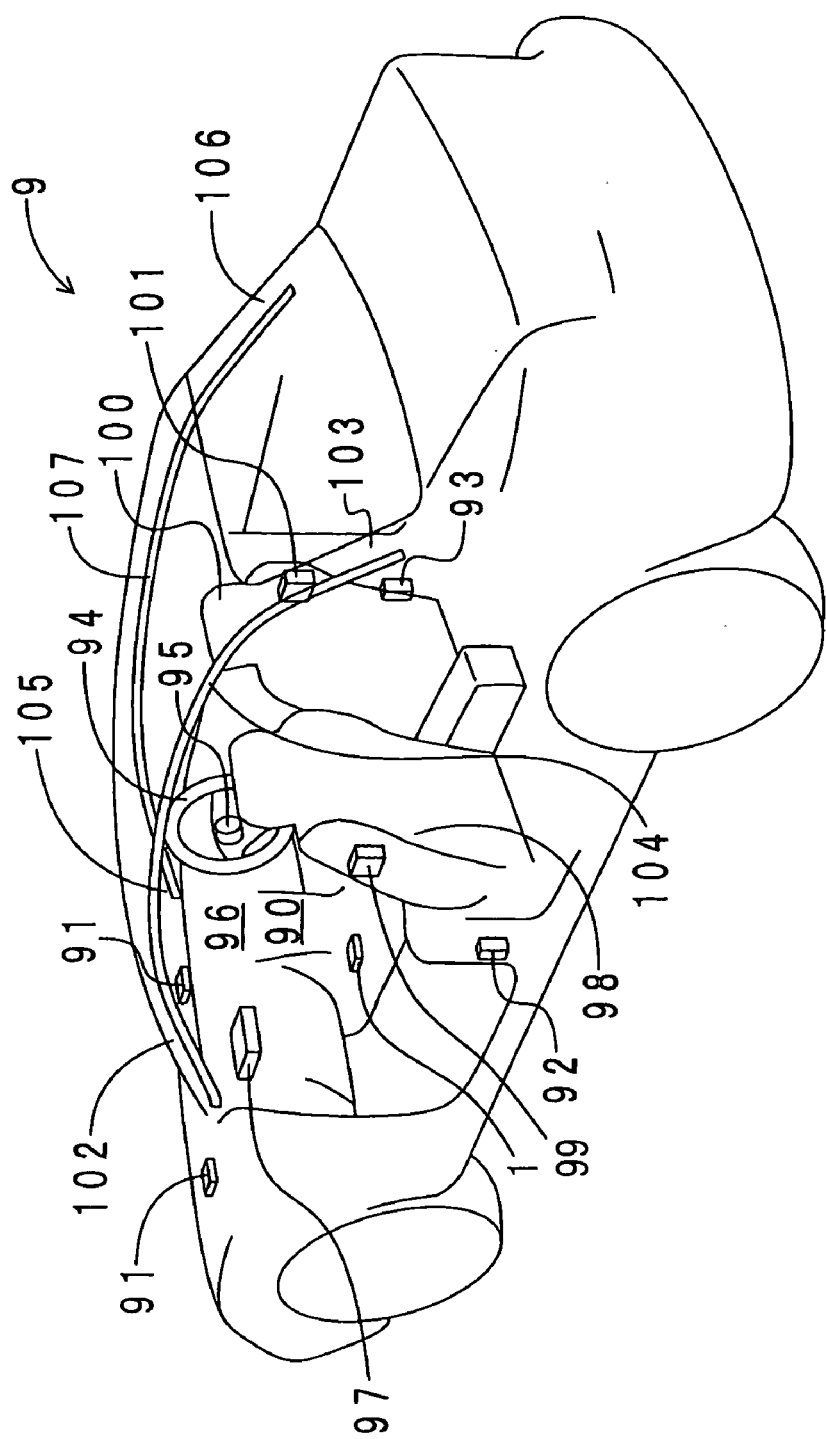
FIG. 1 is a view showing a position of an airbag electrical control unit according to a first embodiment of the present invention.
Figure 2:
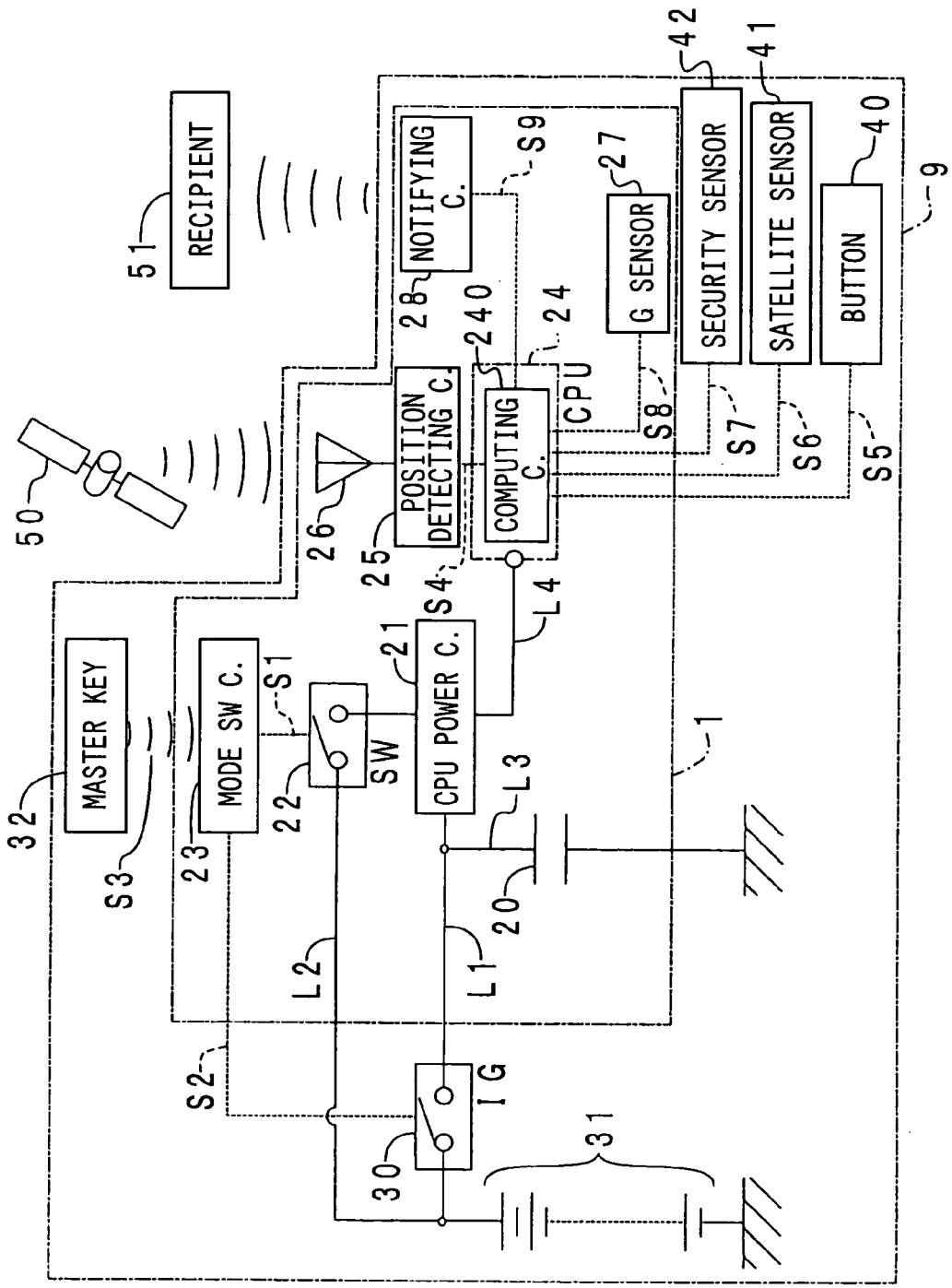
FIG. 2 is a block diagram of an airbag electrical control unit according to the first embodiment.

An airbag ECU (Electrical Control Unit) 1 according to a first embodiment of the present invention will be explained with reference to FIG. 1.

The airbag ECU 1 is embedded in the rear of a center cluster 90, and connected with collision sensors. The collision sensors include two front-collision sensors 91 embedded in a front of a vehicle 9; a left-side-collision sensor 92 embedded in a left side; and a right-side-collision sensor 93 embedded in a right side.

The airbag ECU 1 is further connected with airbags as follows: a driver-seat airbag 95 embedded in a middle of a steering wheel 94; an assistant-driver-seat airbag 97 embedded in a part of an instrument panel 96 facing an assistant-driver seat 98; a left-side airbag 99 embedded in a left side of the assistant-driver seat 98; a right-side airbag 101 embedded in a right side of a driver seat 100; a left-side curtain airbag 104 embedded close to the assistant-driver seat 98 over from a pillar A 102 to a pillar C; a right-side curtain airbag 107 embedded close to the driver seat 100 over from a pillar A 105 to a pillar C 106. For instance, when the vehicle 9 collides at its front, acceleration signals are transmitted from the front-collision sensors 91 to the airbag ECU 1. The airbag ECU 1 expands the driver-seat airbag 95 when an acceleration from a collision exceeds a given value; additionally, the airbag ECU 1 also expands the assistant-driver-seat airbag 97 when it is determined, by a signal from an occupant detecting sensor (not shown), that another occupant is seated on the assistant-driver seat. Thus, when a collision occurs, the corresponding airbag can be promptly expanded based on a direction of the collision and a position of the occupant.

The airbag ECU 1 includes a backup capacitor 20 as a backup power, a CPU power circuit 21, a switch 22, a mode switching circuit 23, a CPU (Central Processing Unit) 24, a position detecting circuit 25, a GPS antenna 26, a G sensor 27, and a notifying circuit 28.

The CPU power circuit 21 is connected with a battery 31, via an ignition switch (IG) 30 (or accessory switch) through a power line L1, and also via the switch 22 through a power line L2. The backup capacitor 20 is connected with the power line L1 by a power line L3. The switch 22 and the mode switching circuit 23 are connected with each other through a signal line S1. The ignition switch 30 and the mode switching circuit 23 are connected with each other through a signal line S2. The mode switching circuit 23 receives an ON signal and OFF signal of an entire-doors lock from a master key 32 through a wireless signal line S3. The entire doors include doors at both sides of the front seats and at both sides of the rear seats, and a luggage door. The CPU power circuit 21 and the CPU 24 are connected with each other through a power line 4.

The CPU 24 includes a computing circuit 240 that is connected with the position detecting circuit 25 and the GPS antenna 26 through a signal line S4. The GPS antenna 26 receives position information from an artificial satellite 50 (or a base station) via a window of the vehicle 9. The computing circuit 240 is connected with an emergency button 40 through a signal line S5. The computing circuit 240 is connected with a satellite sensor 41 through a signal line S6. The computing circuit 240 is connected with a security sensor 42 through a signal line S7. The computing circuit 240 is connected with the G sensor 27 through a signal line S8. The satellite sensor 41 includes the above-described front-collision sensors 91, left-side-collision sensor 92, and right-side-collision sensor 93. The security sensor 42 includes a door-opening-closing detecting sensor (not shown) and a sound detecting sensor (not shown). The computing circuit 240 is connected with the notifying circuit 28 through a signal line S9. The notifying circuit 28 transmits the notification data to the notification recipient 51.

Figure 3:
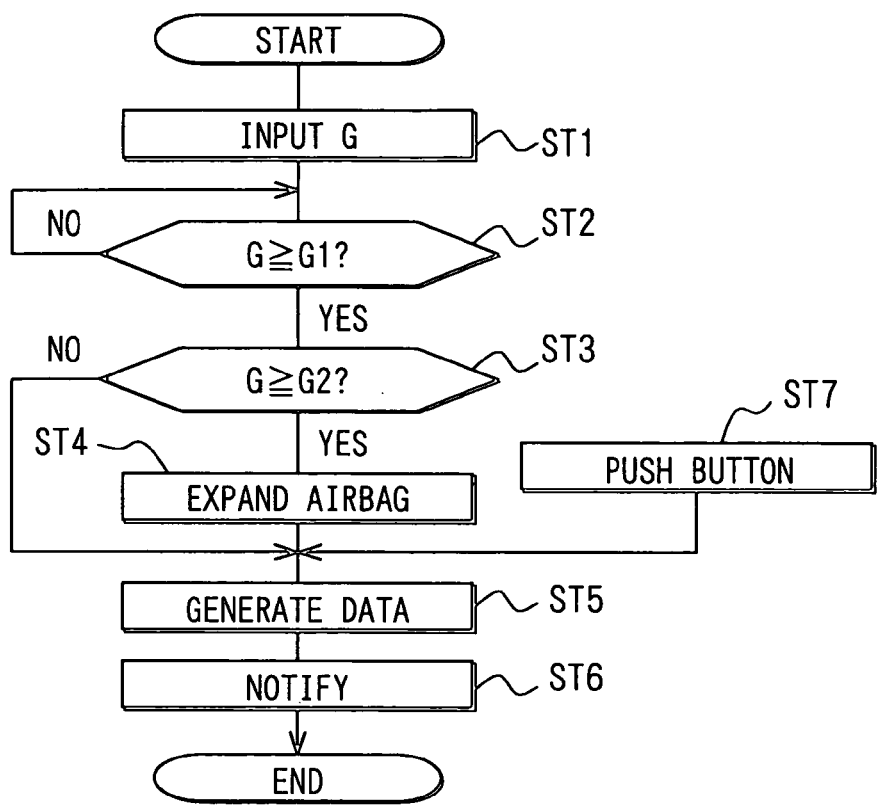
FIG. 3 is a flow chart diagram explaining a traveling mode of an airbag electrical control unit according to the first embodiment.
Figure 4:
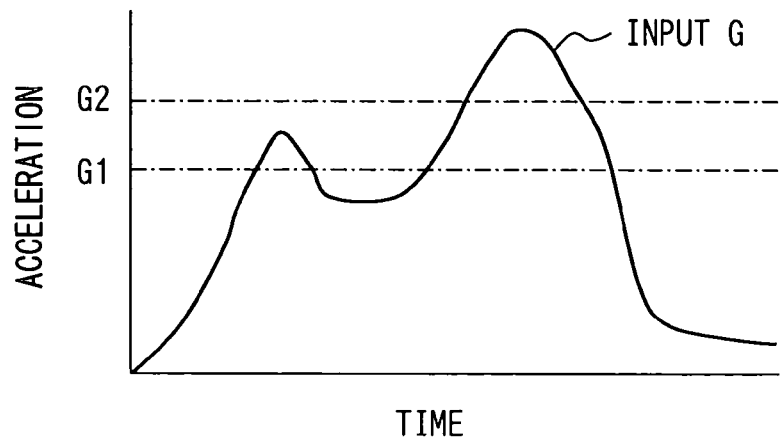
FIG. 4 is a schematic graph showing an acceleration wave shape computed by a computing circuit of an airbag electrical control unit according to the first embodiment.

Next, a traveling mode in the airbag ECU 1 will be explained with reference to a flow chart diagram in FIG. 3. For instance, when the G sensor 27 or the satellite sensor 41 detects an acceleration derived from a collision etc., an acceleration signal is inputted to the computing circuit 240 from the G sensor 27 via the signal line S8 or from the satellite sensor 41 via the signal line S6 (ST1). The computing circuit 240 compares an input G with a previously registered first acceleration level G1 (ST2). When the input G is the acceleration level G1 or more, the input G is compared with a previously registered second acceleration level G2 (ST3). Here, the first and second acceleration levels are shown in FIG. 4. When the input G is the second acceleration level G2 or more, an airbag corresponding to a direction of the collision and a position of an occupant is promptly expanded (ST4), as explained above.

Incidentally, the computing circuit 240 receives a current position (time and position) of the vehicle 9 via the signal line S4 from the position detecting circuit 25 in addition to the input G. The computing circuit 240 generates notification data from the input G, a position of the sensor that detects the input G, and the current position of the vehicle 9 (ST5). The generated notification data is outputted to the notifying circuit 28 through the signal line S9. The notifying circuit 28 transmits the notification data to the notification recipient 51 via the window of the vehicle 9 (ST6).

Here, the process at ST5 where the notification data is generated and the subsequent process at ST6 are executed even when no airbag is expanded or even when the input G is less than the second acceleration level G2, further also being executed when an emergency button 40 is pushed by an occupant (ST7) regardless of the acceleration detected by the G sensor 27 or the satellite sensor 42.

Figure 5:
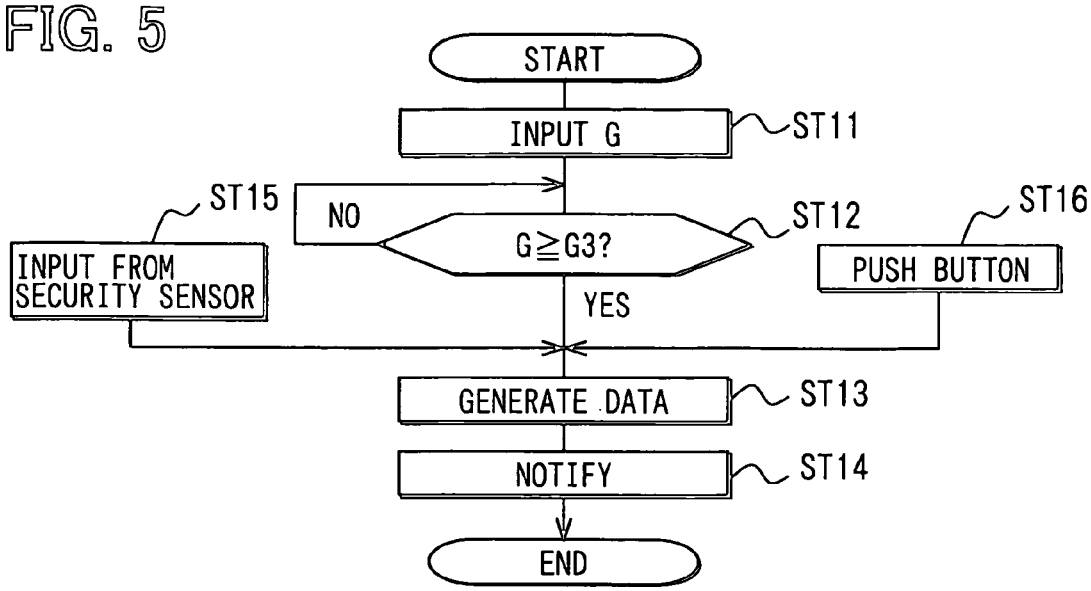
FIG. 5 is a flow chart diagram explaining a parking mode of an airbag electrical control unit according to the first embodiment.

Next, a parking mode in the airbag ECU 1 will be explained with reference to a flow chart diagram in FIG. 5. For instance, when the G sensor 27 or the satellite sensor 41 detects an acceleration derived from a hit-and-run accident while being parked by other vehicles etc., an acceleration signal is inputted to the computing circuit 240 from the G sensor 27 via the signal line S8 or from the satellite sensor 41 via the signal line S6 (ST11). The computing circuit 240 compares an input G with a previously registered third acceleration level G3 (ST12). When the input G is the acceleration level G3 or more, the computing circuit 240 generates notification data from the input G, a position of the sensor that detects the input G, and the current position of the vehicle 9 obtained by the position detecting circuit 25 (ST13). The generated notification data is outputted to the notifying circuit 28 through the signal line S9. The notifying circuit 28 transmits the notification data to the notification recipient 51 via the window of the vehicle 9 (ST14).

Here, the process at ST13 where the notification data is generated and the subsequent process at ST14 are also executed by a signal from the security sensor 42 via the signal line S7. Therefore, the notification data is generated by a signal from the door-opening-closing detecting sensor when any door is opened without an OFF signal of the entire-doors lock of the master key 32. As a result, when a trouble such that the vehicle is stolen or the vehicle is broken into occurs without being detected by the G sensor 27 or the satellite sensor 42, the notification data is sent to the notification recipient 51. Similarly, the process at ST13 where the notification data is generated and the subsequent process at ST14 are also executed when an emergency button 40 is pushed by an occupant (ST16). The occupant can thereby determine to send the notification data to the notification recipient 51.

Next, mode switching from a traveling mode to a parking mode in the airbag ECU 1 will be explained with reference to a flow chart diagram in FIG. 6. When, under a traveling mode (ST21), the ignition switch 30 is turned off (ST22), the power line L1 is shut down. The traveling mode is thereby terminated (ST23). Simultaneously, an IG-OFF signal is sent from the ignition switch 30 to the mode switching circuit 23 via the signal line S2. Here, when an ON signal of the entire-doors lock is sent from the master key 32 to the mode switching circuit 23 via the signal line S3 (ST24), a waiting-period securing timer (not shown) included in the mode switching circuit 23 starts to log an elapsed time T (ST25). When the elapsed time T reaches and exceeds a given time T1 (ST26), a SW-ON signal is sent from the mode switching circuit 23 to the switch 22 via the signal line S1. The battery 31 and the CPU power circuit 21 are thereby connected, which starts a parking mode (ST27).

Figure 7:
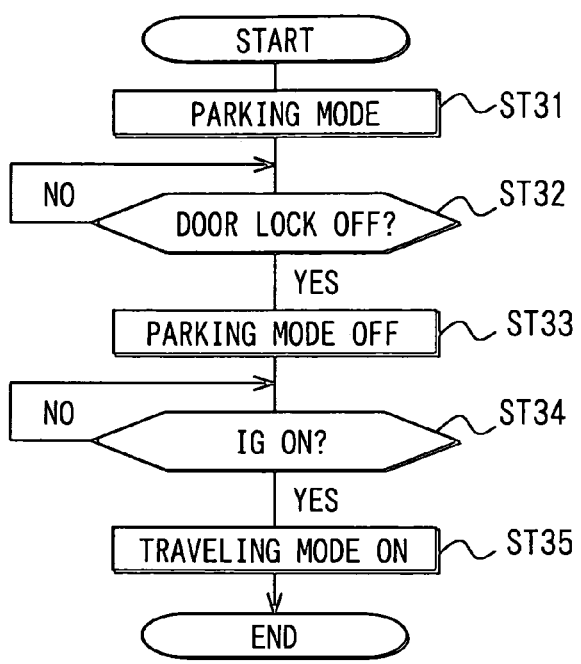
FIG. 7 is a flow chart diagram explaining a switching process to a traveling mode from a parking mode of an airbag electrical control unit according to the first embodiment.

Next, mode switching to a traveling mode from a parking mode in the airbag ECU 1 will be explained with reference to a flow chart diagram in FIG. 7. When, under a parking mode (ST31), an OFF signal of the entire-doors lock is sent from the master key 32 to the mode switching circuit 23 via the signal line S3 (ST32), a SW-OFF signal is sent from the mode switching circuit 23 to the switch 22 via the signal line S1. The power line L2 is thereby shut down, so that the parking mode is terminated (ST33). Here, when the ignition switch 30 is turned on (ST34), the battery 31 and the CPU power circuit 21 are connected via the power line L1, which starts a traveling mode (ST35).

Next, effects from operation of the airbag ECU 1 of this embodiment will be explained below. The airbag ECU 1 of this embodiment can switch between a traveling mode and a parking mode. The traveling mode addresses a traveling-period trouble such as a vehicle-related serious accident, an accident resulting in injury or death, or a hit-and-run accident. The parking mode addresses a parking-period trouble such as a vehicle theft, braking into the vehicle for stealing valuables, or a hit-and-run accident by other vehicles. The airbag ECU 1 according to this embodiment automatically transmits the notification data to the notification recipient 51 when the foregoing troubles occur in both the traveling mode and the parking mode.

Incidentally, the airbag ECU 1 primarily activates the airbag system when an accident occurs. The airbag ECU 1 is thereby contained within a durable casing (not shown) so that the airbag ECU 1 can overcome impact from the accident etc. Consequently, it is unlikely that automatic notification becomes unavailable due to the impact from the accident.

Further, the airbag ECU 1 is required to be not easily removed so that mis-operation of the G sensor 27 or mis-expansion of an airbag 95, 97, 99, 101, 104, 107 can be suppressed. Therefore, it is unlikely that the airbag ECU 1 is artificially removed, e.g, when the vehicle is stolen.

Further, the airbag ECU 1 is embedded in the rear side of the center cluster 90 so that the airbag ECU 1 can endure impact from the entire directions. Therefore, the airbag ECU 1 can securely send notification data to the notification recipient 51 via a vehicle window through which radio waves can be transmitted. Furthermore, position information can be securely obtained from the artificial satellite 50.

Further, the airbag ECU 1 of this embodiment switches between the traveling mode and the parking mode based on an ON signal and OFF signal of the entire-doors lock of the master key 32, or an ON signal and OFF signal of the ignition switch 30. Therefore, two modes are relatively easily switched therebetween.

Figure 6:
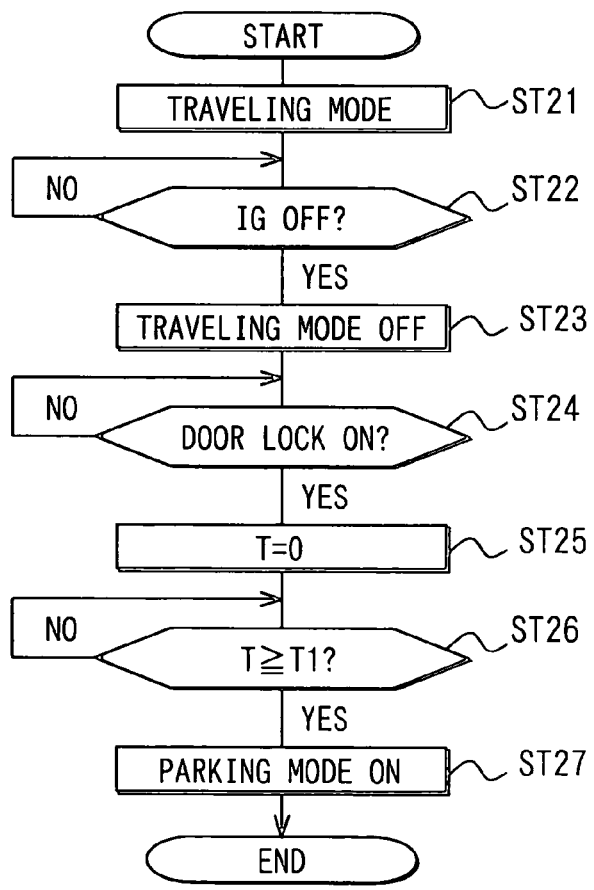
FIG. 6 is a flow chart diagram explaining a switching process from a traveling mode to a parking mode of an airbag electrical control unit according to the first embodiment.

Further, the airbag ECU 1 of this embodiment is equipped with a waiting-period securing timer that secures a waiting period from when an ON signal of the entire-doors lock of the master key 32 is received, to when a traveling mode is switched into a parking mode (ST25, ST26 in FIG. 6). Therefore, the parking mode does not start before the elapsed time T reaches a given waiting time T1 from when the entire-doors lock is turned on. It is thereby unlikely that the security sensor is activated to send mis-notification when an occupant again opens and closes a vehicle door in such a case that the occupant forgets something inside the vehicle.

Further, the airbag ECU 1 of this embodiment is equipped with a backup capacitor 20. Therefore, even when the battery 31 and the airbag ECU 1 are disconnected with each other due to an inevitable accident or an artificial conduct, the notification data can be sent to the notification recipient 51.

Further, the airbag ECU 1 of this embodiment is equipped with a built-in G sensor 27 as one of sensors. Even when the airbag ECU 1 is disconnected with the satellite sensor 41, the notification data can be thereby generated from the acceleration signal from the G sensor 27 to be then sent to the notification recipient 51.

Further, the airbag ECU 1 of this embodiment performs automatic notification even when no airbag is expanded. Namely, even when no airbag is expanded, impact the vehicle 9 undergoes is computed by the acceleration signal from the G sensor 27. The notification data is then sent to the notification recipient 51 via the notifying circuit 28. This means that the airbag ECU 1 that is used only for determining expanding of an airbag or not is effectively used.

Further, the airbag ECU 1 of this embodiment can notify the notification recipient 51 of impact, in detail, a degree of the impact (input G); a position where the impact is applied (a position of the sensor that detects the impact); and a current position, by using the sensors for the airbag system such as the G sensor 27 or the satellite sensor 41. The notification recipient 51 can thereby specify a degree of the accident, or a position where the impact is applied, the position which indicates such as a front collision, a side collision, etc. Further, an accident resulting in injury or death of a pedestrian such as a hit-and-run accident can be also automatically notified.

(Second Embodiment)

A featured difference of a second embodiment from the first embodiment is that mode switching between a traveling mode and a parking mode is performed based on an ID (IDentification) code of a transponder of an immobilizer and an ON signal and OFF signal of the entire-doors lock of the master key 32. Further, under the parking mode, a vehicle's current position alone is periodically sent to the notification recipient. Only the different part will be explained below.

Figure 8:
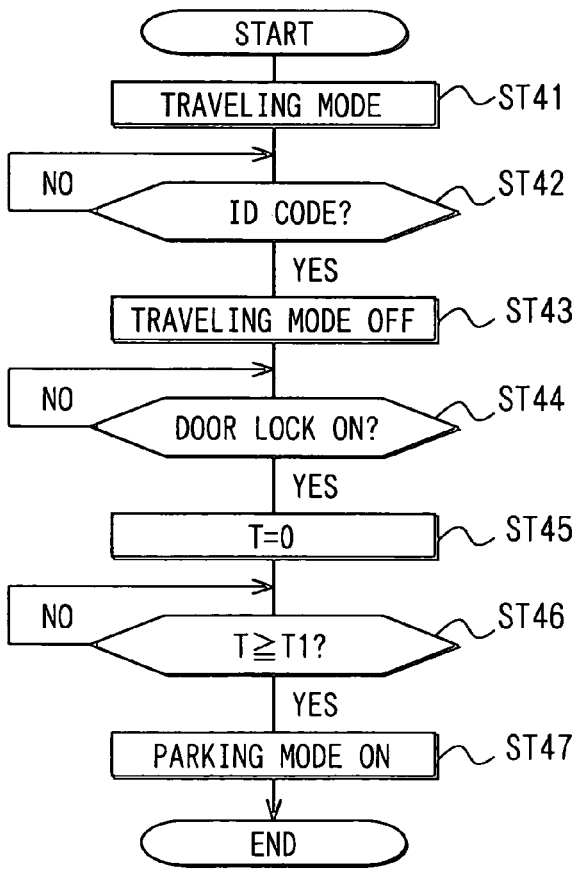
FIG. 8 is a flow chart diagram explaining a switching process from a traveling mode to a parking mode of an airbag electrical control unit according to a second embodiment of the present invention.

Mode switching from a traveling mode to a parking mode in the airbag ECU 1 will be explained with reference to a flow chart diagram in FIG. 8. When, under a traveling mode (ST41), an ID code is sent to the mode switching circuit 23 from a transponder of the master key 32 (immobilizer) (ST42), the traveling mode is thereby terminated (ST43). Here, when an ON signal of the entire-doors lock is sent from the master key 32 to the mode switching circuit 23 (ST44), a waiting-period securing timer starts to log an elapsed time T (ST45). When the elapsed time T reaches and exceeds a given time T1 (ST46), a SW-ON signal is sent from the mode switching circuit 23 to the switch 22. The battery 31 and the CPU power circuit 21 are thereby connected via the power line L2, which starts a parking mode (ST47).

Figure 9:
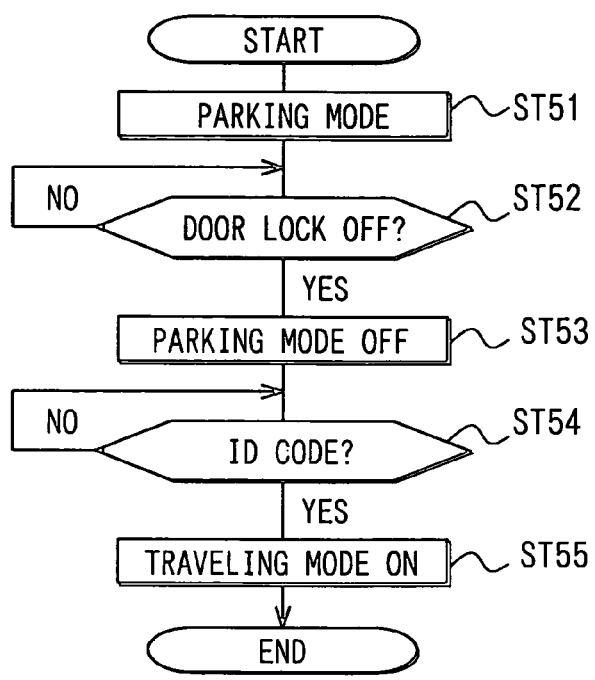
FIG. 9 is a flow chart diagram explaining a switching process to a traveling mode from a parking mode of an airbag electrical control unit according to the second embodiment.

Next, mode switching to a traveling mode from a parking mode in the airbag ECU 1 will be explained with reference to a flow chart diagram in FIG. 9. When, under a parking mode (ST51), an OFF signal of the entire-doors lock is sent from the master key 32 to the mode switching circuit 23 (ST52), a SW-OFF signal is sent from the mode switching circuit 23 to the switch 22. The parking mode is thereby terminated (ST53). Here, when the ID code is sent from the transponder of the master key 32 (ST54), the battery 31 and the CPU power circuit 21 are connected via the power line L1, which starts a traveling mode (ST55).

Figure 10:
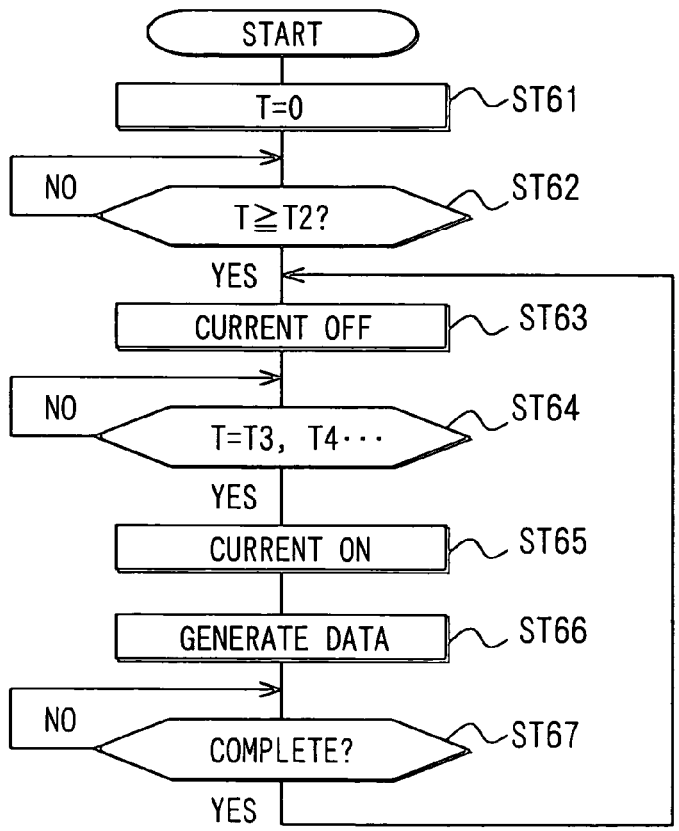
FIG. 10 is a flow chart diagram explaining a parking mode of an airbag electrical control unit according to the second embodiment.

Processes under a parking mode will be explained with reference to a flow chart diagram in FIG. 10. When the parking mode starts at ST47 in FIG. 8, a current-conducting timer contained in the CPU power circuit 21 starts to log an elapsed time T (ST61). Here, the current-conducting timer functions as a current controlling unit. When the elapsed time T reaches or exceeds a given time T2 (ST62), the CPU power circuit 21 shuts itself. Conducting of current to the CPU 24 is thereby stopped (ST63). Thereafter, when the elapsed time T reaches a given time T3 (ST64), conducting of current is resumed to the CPU 24 (ST65). The computing circuit 240 generates notification data including only the current position inputted from the position detecting circuit 25 (ST66). After the generated notification data is sent by the notifying circuit 28 to the notification recipient 51 (ST67), conducting of current to the CPU 24 is stopped again (ST63). Subsequent conducting of current to the CPU 24 is resumed when the elapsed time T reaches a given time T4. Namely, conducting of current is periodically performed at T=T3, T4 . . . every 12 hours.

The airbag ECU 1 of the second embodiment has the same effects as that of the first embodiment. Further, the airbag ECU 1 enables periodic confirmation of a current position of the vehicle, for instance, when the vehicle is stolen. Further, the airbag ECU 1 suppresses consumption of the battery 31 under the parking mode, increasing a continuation period of the parking mode. When the master key 32 is copied, switching between the traveling mode and the parking mode cannot be possible, increasing reliability against a theft etc.

(Others)

The present invention is not limited to the above embodiments. For instance, under a parking mode, the process shown in FIG. 5 can be performed for a certain period, while the process shown in FIG. 10 can be performed after the certain period passes. Here, the airbag ECU 1 addresses a trouble where a vehicle is not moved, such as breaking into the vehicle for stealing something inside the vehicle (for the certain period), while the continuation period of the parking mode can be extended.

The position detecting circuit 25 does not need to use the GPS. For instance, a gyroscope or a vehicle speed sensor can be used for detecting a position by itself or by combining the multiple sensors. The notification recipient 51 can be assigned to the police, a vehicle having a VICS (Vehicle Information and Communication System), a fire station, a toll booth in an expressway or toll road, a managing center for empty information regarding parking lots, etc. The notification recipient of the present invention can be not only alone but also multiple recipients.

The kinds of security sensors do not need to be limited as long as the stolen vehicle or breaking into the vehicle can be detected. The G sensor 27 and the satellite sensor 41 can be mechanical or electromotive as long as an acceleration can be detected.

A position where the airbag ECU 1 is disposed can be anywhere; however, a position near an interior of the vehicle is preferable. A position near the interior of the vehicle and around the middle of the vehicle width direction is further preferable. This position enables the airbag ECU 1 securely to receive position information from the artificial satellite 50 and to transmit notification data to the notification recipient 51 via a window of the vehicle 9.

The kind of the GPS antenna 26 is not limited to any kind. For instance, it can be film shaped, or chip shaped. Specifying a degree of an accident, a collision position such as front-collision, or side-collision can be executed also by the computing circuit 240 instead of the notification recipient 51. Here, a situation regarding an accident can be notified to the notification recipient 51 using a voice.

Under a parking mode, an automatic notification can be combined with an alarm, a camera, or the like. Thus, reliability to a trouble regarding the stolen vehicle or breaking into the vehicle can be enhanced. Switching between a traveling mode and a parking mode can be performed based on an engine rotation number, a seat-belt switch for a driver seat, a vehicle speed, a parking brake signal, or the like.

The present invention enhances practicability of the airbag ECU 1. The practicability of the airbag ECU 1 means that the airbag ECU 1 can be used widely by the general public as a standard product. By practically achieving an automatic parking-period notification system that is desired by a vehicle owner, a proper damage accident or an accident resulting in injury or death of a person, etc. can be notified. Here, up to now, sensing or dealing with, by an airbag system, the proper damage accident or the accident resulting in injury or death of a person was supposed to be unnecessary or meaningless. The present invention achieves enhancement in morals relating to an automobile society and suppresses crimes relating to vehicles.

The present invention enhances expandability of the airbag ECU 1. This means data for smoothing vehicle traffics or city development can be collected by collecting position information of the entire vehicles in very low costs.

It will be obvious to those skilled in the art that various changes may be made in the above-described embodiments of the present invention. However, the scope of the present invention should be determined by the following claims.

What is claimed is:

1. An airbag electrical control unit mounted in a vehicle, the airbag electrical control unit comprising:
    a position detecting circuit that detects a current position of the vehicle;
    a computing circuit that computes impact that the vehicle undergoes using a signal from a sensor; and
    a notifying circuit that notifies a previously designated recipient of notification data that includes the detected current information alone or both the detected current position and the computed impact,
    wherein a traveling mode and a parking mode are switched between each other, wherein the traveling mode addresses a traveling-period trouble generated while the vehicle is traveling, wherein the parking mode addresses a parking-period trouble generated while the vehicle is being parked.

2. The airbag electrical control unit of claim 1,
    wherein the notifying circuit periodically notifies the recipient of the notification data while the vehicle is being parked.

3. The airbag electrical control unit of claim 1, further comprising:
    a current controlling circuit that controls a current-conducting period for which an electric current is conducted under the parking mode.

4. The airbag electrical control unit of claim 1,
    wherein the position detecting circuit detects the current position of the vehicle using a global positioning system that obtains position information from one of an artificial satellite and a base station.

5. The airbag electrical control unit of claim 1,
    wherein the traveling mode and the parking mode is switched between each other based on one of an ignition switch and an accessory switch.

6. The airbag electrical control unit of claim 1,
wherein the traveling mode and the parking mode is switched between each other based on an ID code of a transponder of an immobilizer.

7. The airbag electrical control unit of claim 1,
wherein the traveling mode and the parking mode is switched between each other based on an entire-doors lock of a master key.

8. The airbag electrical control unit of claim 7, further comprising:
a waiting-period securing circuit that secures, after the ON signal of the entire-doors lock of the master key is received, a waiting period before the traveling mode is switched into the parking mode.

9. The airbag electrical control unit of claim 1, further comprising:
a backup power that is activated when a conducted electric current from a main power is shut down.

10. The airbag electrical control unit of claim 1,
wherein the sensor is included in a plurality of sensors that include at least a G sensor for an airbag.

11. The airbag electrical control unit of claim 10,
wherein, even when the airbag is not expanded, the notifying circuit notifies the recipient of the notification data that includes the computed impact.

* * * * *